United States Patent [19]

Foster

[11] Patent Number: 5,727,672

[45] Date of Patent: Mar. 17, 1998

[54] PULTRUDED CONVEYOR SLATS

[76] Inventor: Raymond Keith Foster, 401 NW. Adler, Madras, Oreg. 97741

[21] Appl. No.: 832,370

[22] Filed: Apr. 2, 1997

[51] Int. Cl.[6] ............................................. B65G 25/00
[52] U.S. Cl. ................................... 118/750.2; 198/750.1
[58] Field of Search ........................... 198/750.1, 750.2, 198/750.3, 750.4, 750.5, 750.6, 847

[56] References Cited

U.S. PATENT DOCUMENTS

| | | | |
|---|---|---|---|
| 5,447,222 | 9/1995 | Foster | 198/750.2 |
| 5,655,645 | 8/1997 | Foster | 198/750.3 |

Primary Examiner—James R. Bidwell
Attorney, Agent, or Firm—Delbert J. Barnard

[57] ABSTRACT

A conveyor slat (CS) is formed by pultrusion (FIG. 1). It has a slat body comprising a resin matrix and reinforcement fibers (66) and/or fiber fabric (68). At least some of the fibers (66, 68) extend longitudinally of the slat body. Others extend transversely of the slat body. Surface veils are provided where the slats contact the bearings (34, 72, 74, 76) or are contacted by seals (136, 162). The conveyor slats (CS) can be made from a food grade resin. Grit (128) may be bonded to upper surfaces (124) of the conveyor slat (CS) to provide such upper surfaces with high friction characteristics.

25 Claims, 9 Drawing Sheets

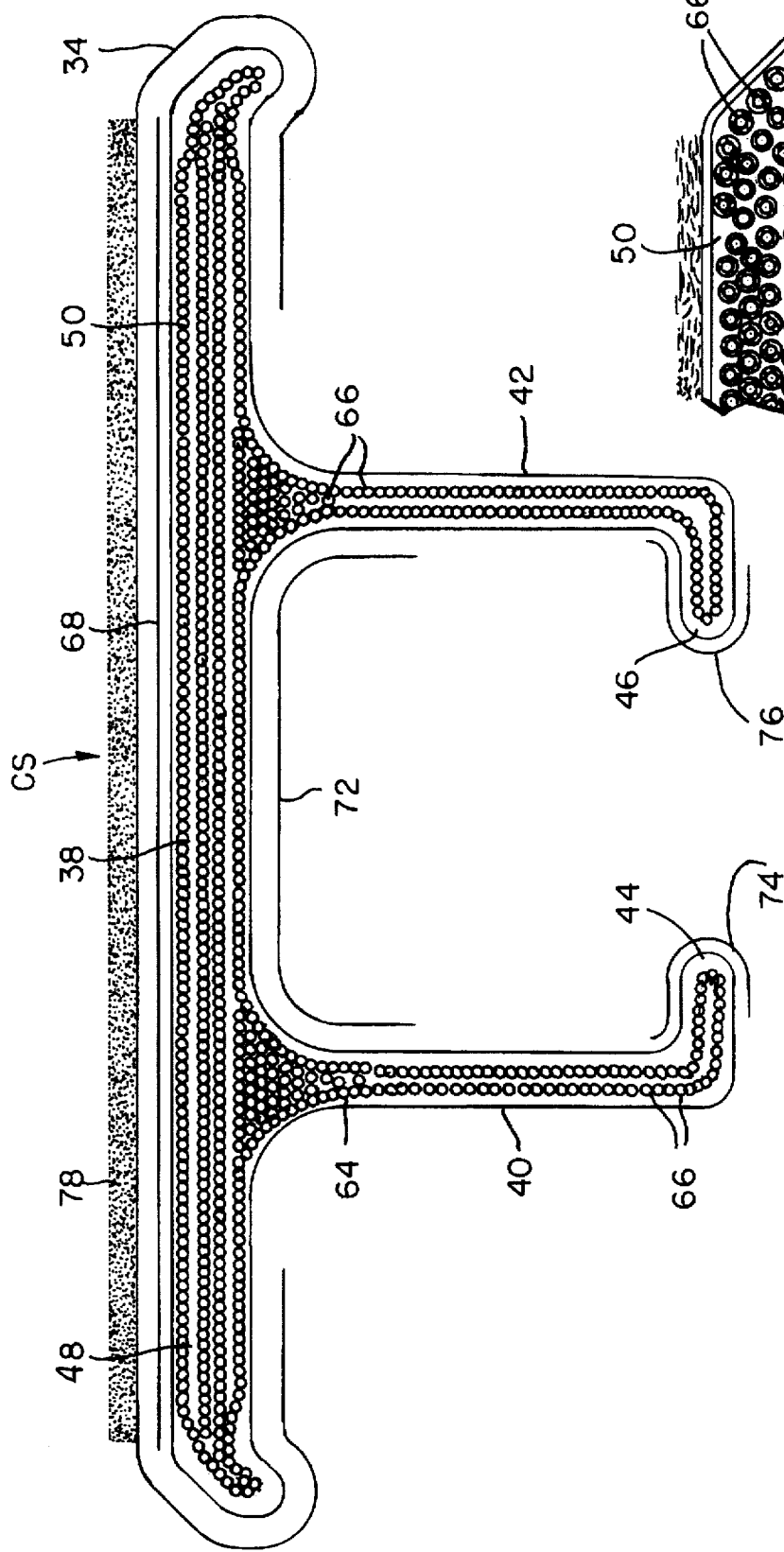
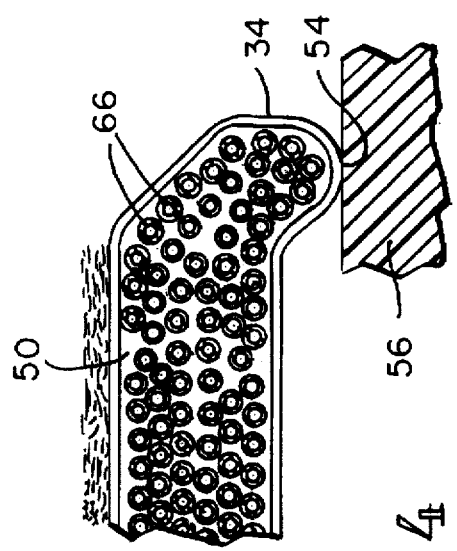
FIG. 3
FIG. 4

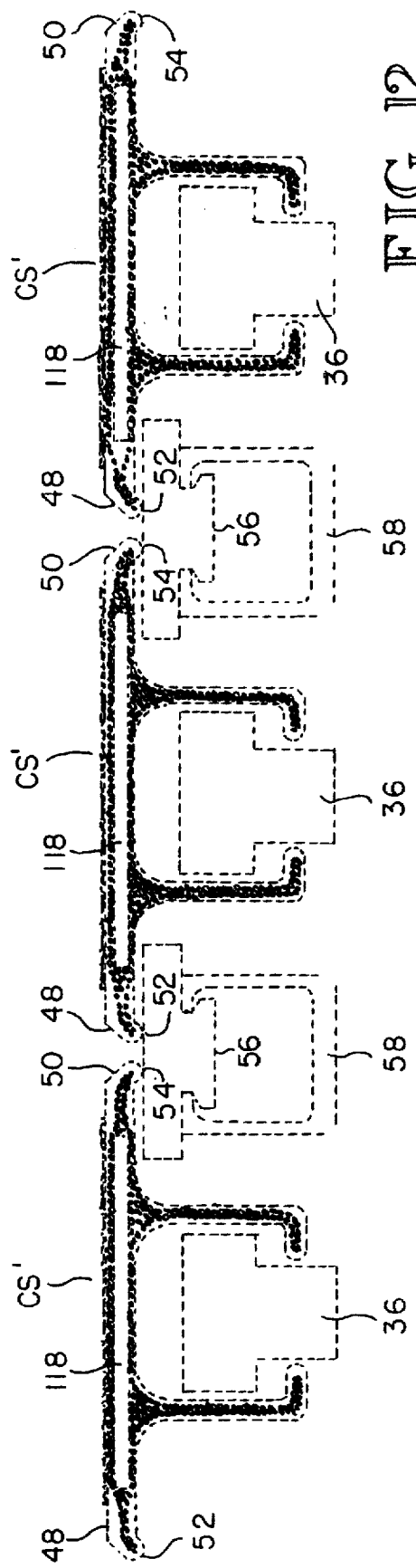
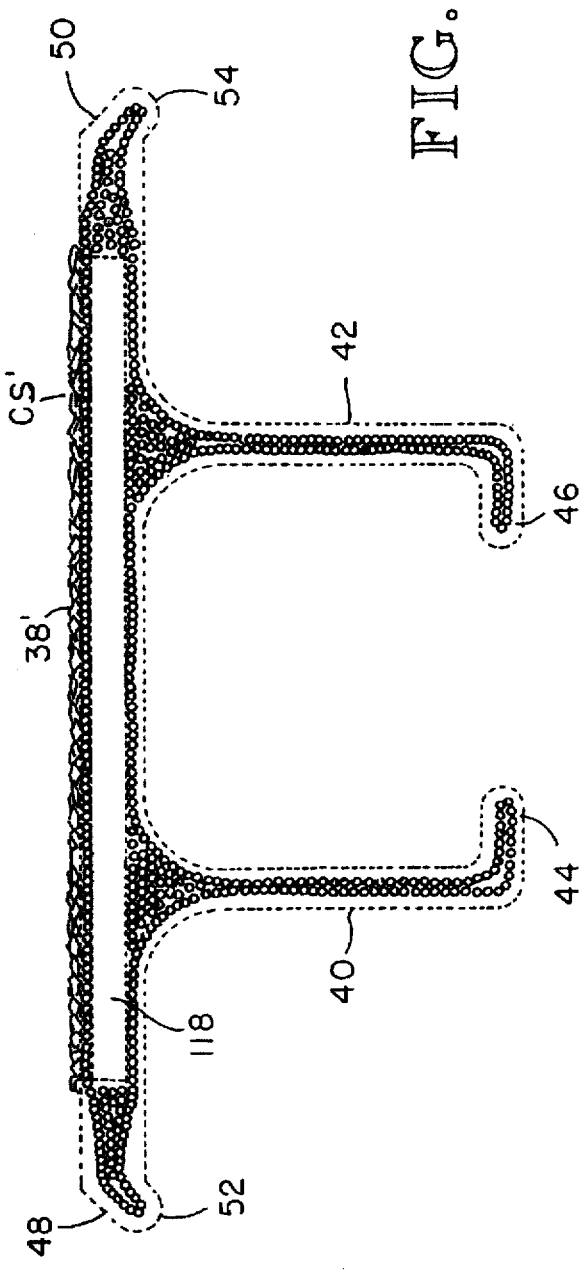
FIG. 12
FIG. 13

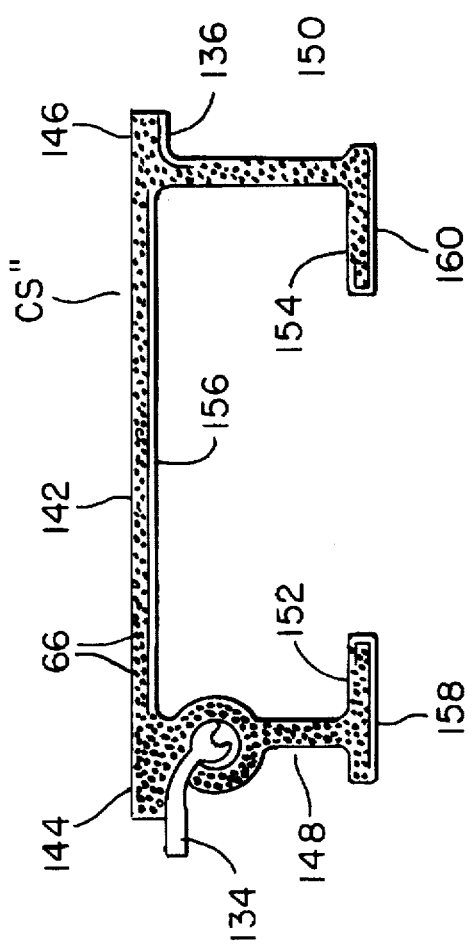
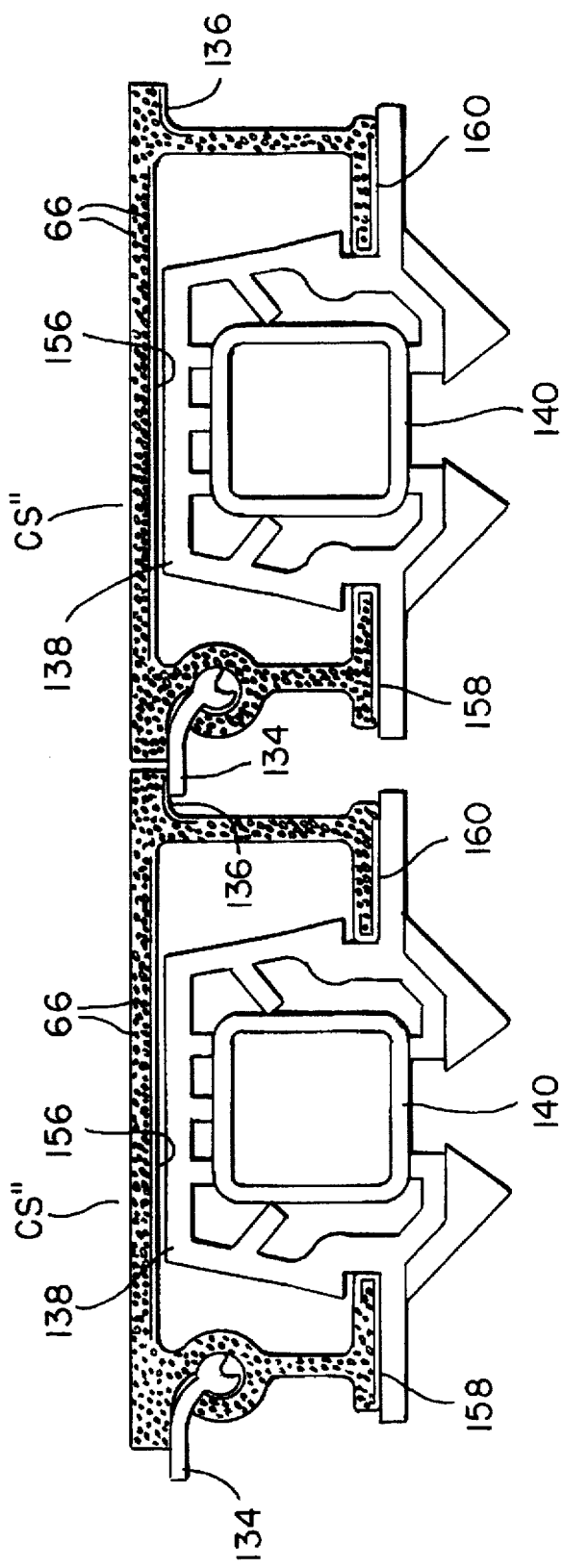

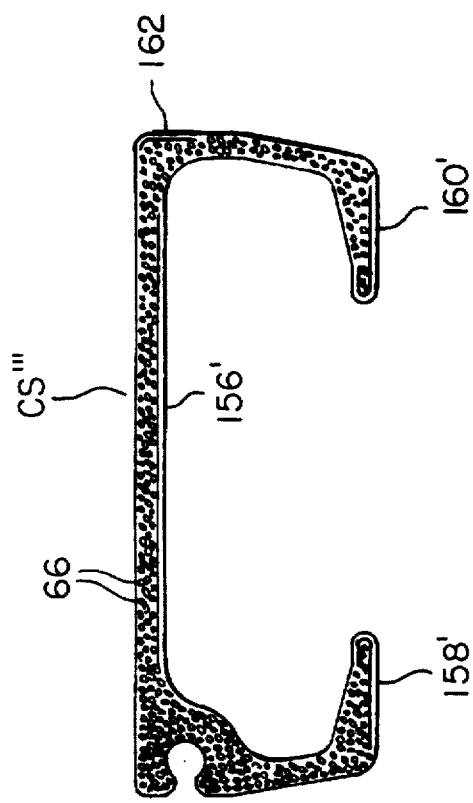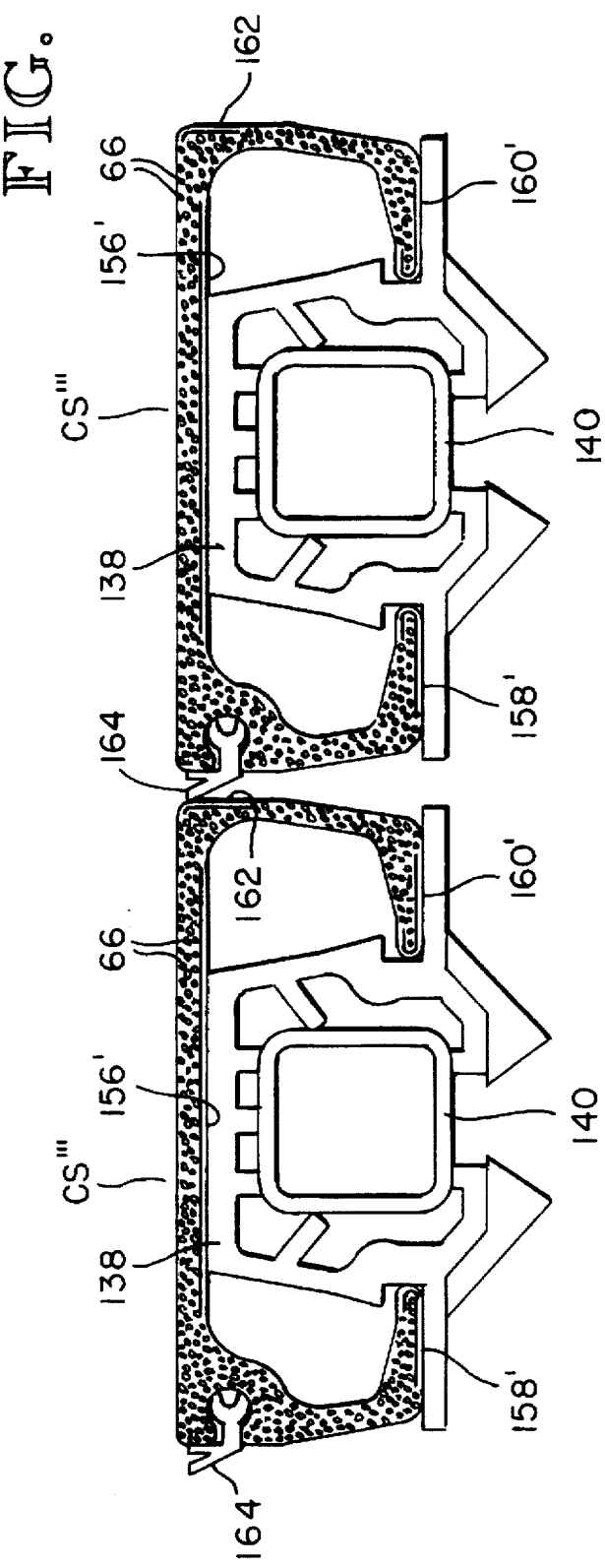

5,727,672

PULTRUDED CONVEYOR SLATS

TECHNICAL FIELD

This invention relates to reciprocating slat conveyors. More particularly, it relates to the provision of fiber reinforced, composite conveyor slats, manufactured by a pultrusion process.

BACKGROUND OF THE INVENTION

Reciprocating slat conveyors comprise a plurality of side by side conveyor slats that are driven in one direction for advancing a load and are retracted in the opposite direction. A reciprocating slat conveyor is divided into both "sets" and "groups" of conveyor slats. The slats of each "set" are moved together. Each "group" includes one slat from each "set." In some slat conveyors, all of the slats are driven in unison, in the conveying direction, and are then retracted sequentially, one set at a time. It has also been proposed to drive a majority of the conveyor slat sets in the conveying direction while retracting the remaining conveyor slat sets, to continuously move the load on the conveyor. An example of the first type of conveyor is disclosed in my U.S. Pat. No. Re. 35,022, granted Aug. 22, 1995. An example of the second type of conveyor is disclosed in my U.S. Pat. No. 4,580,678, granted Apr. 8, 1986.

Conveyor slats have been constructed from aluminum, steel and structural plastic. The aluminum and structural plastic slats are formed by extrusion. The steel slats are roll formed. Example aluminum slats are disclosed by my U.S. Pat. No. 4,785,929, granted Nov. 22, 1988. Example steel slats are disclosed by my U.S. Pat. No. Re. 33,196, granted Apr. 10, 1990. Example structural plastic slats are disclosed by my U.S. Pat. No. 5,447,222, granted Sep. 5, 1995, and by U.S. Pat. No. 5,301,798, granted Apr. 12, 1994, to Arthur L. Wilkins. The Wilkins U.S. Pat. No. 5,301,798 discloses forming slats by extrusion. My U.S. Pat. No. 5,447,222 discloses forming slats by co-extrusion.

The term pultrusion is used to describe both a process of manufacture and the products manufactured by the process. The process begins with the delivery of an organized schedule of reinforcement fibers from storage creels through guides into an impregnation zone where the reinforcement fibers are saturated with a liquid thermal setting resin that is reactive at elevated temperatures yet stable at ambient temperatures. After saturation, the reinforcement fibers are moved from the impregnation zone to and through formers in which they are formed progressively in stages to remove excess resin and to achieve the approximate geometry of the finished profile. Following this pre-forming step, the materials are compacted into the final densified structure as they enter the tapered mouth of a pultrusion die. The pultrusion die is a self contained reaction vessel in which rapid polymerization of the resin occurs when exposed to the elevated die temperature environment. The moving material is constrained within the close tolerances of the die as it is being cured. Upon achieving a sufficient level of polymerization, the material is pulled out from the die and is generally allowed an interval of movement through space so as to cool by natural or forced convection to a level below which the pulling device, employed to grip and pull the product, will not damage the composite profile. The pulling mechanism is followed by a flying cut-off saw which enables the product to be cut to length without interruption of the continuous pull motion.

There is a need for conveyor slats that are chemical resistant and non-corrosive and yet are light weight, tough and strong. A principal object of the present invention is to provide such a conveyor slat.

DISCLOSURE OF THE INVENTION

Pultruded conveyor slats constructed in accordance with the present invention are basically characterized by a resin matrix forming a slat body having a top portion and a pair of laterally spaced apart side portions depending from said top portion. There are reinforcement fibers in the top portion and in at least lower sections of the side portions. At least some of the reinforcement fabrics extend longitudinally of the slat body. In use, the longitudinal fibers in the top portion resist any tendency of the conveyor slat to bend upwardly and the longitudinal fibers in the lower sections of the side portions resist any tendency of the conveyor slat to bend downwardly.

In the preferred embodiment, at least the top portion also includes laterally extending reinforcement fibers. At least some of the longitudinally extending reinforcement fibers and the laterally extending reinforcement fibers may together form a reinforcement fiber fabric. In the preferred embodiment, at least a portion of the reinforcement fibers in the resin matrix are individual fiber strands.

According to an aspect of the invention, the top portion of the slat includes an upper surface and a high friction grit bonded to the upper surface.

According to another aspect of the invention, the top portion of the conveyor slat includes an upper surface and a veil is bonded to the upper surface, to increase wear resistance to said upper surface and to prevent reinforcement fibers from reaching the upper surface.

Other aspects of the invention include pretensioning the longitudinally extending reinforcement fibers; using a food grade resin for the matrix, so as to permit the conveyor slat to be used for carrying substances that must only be contacted by food grade materials; positioning a low density insert in the matrix, extending longitudinally of the slat body, to increase the stiffness and decrease the weight of the slat; disbursing particles of a material lower in density than said resin throughout at least a portion of the matrix, also to decrease weight; or disbursing in the resin matrix a material for improving ultra violet light resistance, abrasion resistance, or to add color identification; or to lower friction.

Pultruded conveyor slats have several advantages over extruded plastic or metal slats. Firstly, they are light weight but yet quite strong and dimensionally stable. Resins can be selected that are chemical resistant and non-corrosive. Food grade resins can be used, enabling the conveyors to convey various food items and food grade ice. Several materials can be combined together to provide different regions of the conveyor slats with different characteristics. For example, a first material can be used to provide lower surface portions of the slats with low friction characteristics. A grit layer may be bonded to the upper surfaces of the slat, for providing such surface with a high coefficient of friction. At the same time, the slats can be made quite strong by the incorporation of reinforcement fibers into the slat body. The weight of the slats may be reduced by incorporating low density materials into the slat body.

These and other advantages, objects and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 3 is an enlarged scale cross-sectional view of a conveyor slat, showing reinforcement and veil fabrics and a grit top layer spaced from the slat body;

FIG. 4 is an enlarged scale fragmentary cross-sectional view of a lip portion of the conveyor slat, showing a veil extending around the lip edge;

FIG. 12 is a view like FIG. 2, but of a modified form of conveyor slats that is provided with a low density insert panel for the top of the slats;

FIG. 13 is a view like FIG. 3 but of the slat embodiment shown by FIG. 12;

FIG. 17 is a view like FIGS. 3 and 13, but of another embodiment of the invention;

FIG. 18 is a view like FIG. 2, but of the conveyor slat embodiment shown by FIG. 17;

FIG. 19 is a view like FIGS. 3, 13 and 17, but of yet another embodiment of the invention; and FIG. 20 is a view like FIGS. 2, 12 and 18, but of the conveyor slat embodiment shown by FIG. 19.

BEST MODE FOR CARRYING OUT THE INVENTION

Figure 1:
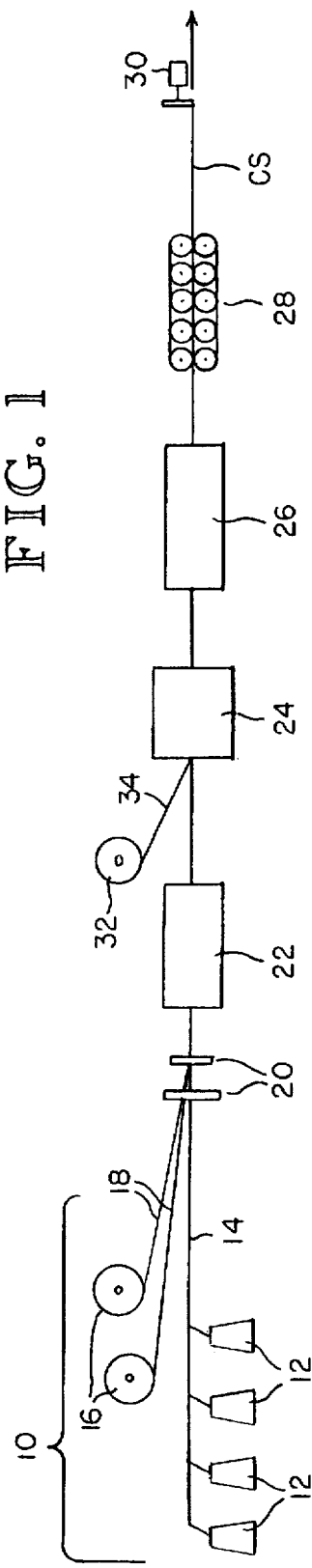
FIG. 1 is a schematic diagram of a pultrusion process used for forming pultruded conveyor slats in accordance with the present invention.

FIG. 1 is a schematic diagram of a pultrusion process. A storage region 10 includes bobbins or bundles 12 of reinforcement fiber strands or yarn 14, and reels 16 on which reinforcement fiber fabrics or mats 18 are wound. In the art, the individual fiber strands or yarns 14 are also known as "rovings."

The reinforcement fibers 14 and fabrics or mats 18 are delivered to and through guides 20. From the guides 20 they enter an impregnation zone 22 where they are saturated with a liquid thermosetting resin that is reactive yet stable at ambient temperatures. After saturation, the reinforcement fibers 14 and fabrics 18 are moved from the impregnation zone 22 to and through preformers 24 in which they are moved progressively in stages to remove excess resin and to achieve the approximate geometry of the finished profile of the formed member. Following this pre-forming step, the materials are compacted into the final densified slat structure as they enter the mouth of a pultrusion die 26. The pultrusion die 26 is a self-contained reaction vessel in which rapid polymerization of the resin occurs when exposed to the elevated die temperature environment. The moving material is constrained within the close tolerances of the die as it is being cured. Upon achieving a sufficient level of polymerization, the material is pulled out from the die 26 and is generally allowed an interval of movement through space so as to cool by natural or forced convection to a level below which the pulling device 28, employed to grip and pull the formed member, will not damage the composite profile. The pulling mechanism 28 is followed by a flying cut-off saw 30 which enables the product to be cut to length without interruption of the continuous pull motion. One or more veil fabrics may be added to cover the resin coated fibers before they are introduced into the pre-former 24. Or, one or more veil fabrics may be added to the slat body downstream of the preforms and upstream of the die 26. FIG. 1 shows a single reel 32 of a veil fabric 34.

Figure 2:
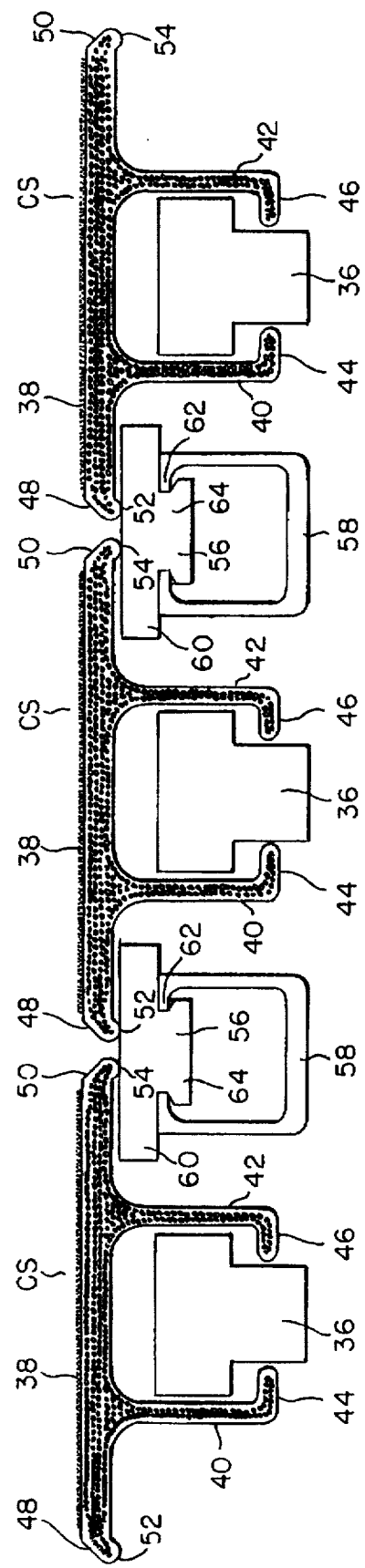
FIG. 2 is a fragmentary sectional view of a slat conveyor that includes conveyor slats constructed in accordance with the present invention.

FIGS. 2–6 illustrate a preferred conveyor slat CS. FIG. 2 shows three conveyor slats CS positioned side by side on guide members 36. The conveyor shown by FIG. 2 is basically like the conveyor disclosed by U.S. Pat. No. 5,560,472, granted Oct. 1, 1996, to Richard T. Gist. The contents of this patent are incorporated herein by this specific reference.

In preferred form, each conveyor slat CS has a top portion 38 and a pair of side portions 40, 42. Side portions 40, 42 include lower sections 44, 46 that turn inwardly towards each other. The conveyor slat's top 38 includes wing portions 48, 50 that extend laterally outwardly from the side portions 40, 42. Wing portions 48, 50 include downwardly projecting flanges or lips which are termed both "downwardly extending ears" and "vertically disposed sidewalls" in U.S. Pat. No. 5,560,472. As shown by FIG. 2, the downwardly projecting lips or flanges have lower edges 52, 54 that contact and ride on bearing members 56. The bearing members 56 are constructed from a high molecular weight resinous material, referred to as UHMW plastic. This material is readily available, is strong, is easily formed to the desired cross section, and has exceptionally low surface friction. It is known to be an excellent bearing material.

Bearing members 56 extend lengthwise along support members 58, shown in the form of open top channel metal extrusions or roll formed shapes. In preferred form, the bearing members 56 are formed to include top portions 60, neck portion 62, and bottom portions 64. Top portions 60 set down onto upper surfaces of the support members 58. The neck portions 62 are approximately equal in width to the distance between two endwardly directed lips that form the top portions of the support members 58. Bottom portions 64 of bearing members 56 are wider than the distance between the lips. Thus, a slot is formed on each side of each bearing member 56, laterally outwardly from the neck 62 and vertically between the top and bottom portions 60, 62. The lips of the support members 58 project into these slots. In this manner, the bearing members 56 are held against sideways movement and vertical movement up off of the support members 58. One or more rivets, or the like (not shown), may be used to connect the bearing members 56 to the support members 58, to secure them against longitudinal movement.

As explained in U.S. Pat. No. 5,560,472, when the conveyor slats 38 are under load, the edges 52, 54 and the top portion 60 of the bearing members 56 form an effective and very simple seal against the migration of particulate material between the edges 52, 54 and the top portions 60 of the bearing members 56. During use, the reciprocating movement of the edges 52, 54 on the top portions 60 of the bearing members 56 will over time form grooves in the upper surfaces of the upper portions 60 of the bearing members 56. In response to the wear, the edges 52, 54 and the grooves will conform to each other, further enhancing the sealing contact between the conveyor slats 38 and the bearing members 56.

Referring to FIG. 3, the preferred embodiment comprises a composite slat body including reinforcement fibers within a resin matrix 64. The reinforcement fibers may be both individual fibers or strands, some of which are designated 66, and one or more reinforcement fabrics 68. It is preferred that the conveyor slat CS be composed of mainly reinforcement fibers 66, 68 with the resin matrix 64 being as small amount as is needed to adequately bond the fibers 66, 68 together. By way of example, a given slat may be composed of between about fifty and seventy percent (50%–70%) by weight reinforcement fibers and about twenty to twenty-five percent (20%–25%) by weight resin. The balance is fillers and additives provided to impart special properties to improve slat performance and/or reduce cost.

In preferred form, the upper portion of the conveyor slat CS is covered by a first veil 34. A second veil 72 may be provided below the slat top 38, between the side portions 40, 42. Third and fourth veils 74, 76 may be wrapped around the inner edges of the bottom sections 44, 46. The veils 34, 72, 74, 76 are a cloth or film having different surface characteristics than the resin that forms the matrix 64. The veil 34 performs several functions. Firstly, it shields against reinforcement fibers being at the surface of the conveyor slat CS. By way of example, the veil 34 may be a polyester cloth. Polyester cloth provides a smooth, low friction surface. In some installations, a veil of sail-cloth or the like may be applied to the conveyor slat. After its application, this veil is pulled off from the slat to leave a rough surface on the slat to which some other material may be readily bonded.

The individual reinforcement fibers, strands or yarn may be glass fibers. The reinforcement fabric 68 may be glass fabrics, either woven or unwoven. An unwoven fabric, or continuous strand mat, is made by laying down continuous fibers in a random fashion, to produce a sheet of interlocked fibers which have no particular length or orientation. It is made by orienting a first layer of fibers generally in one direction and then laying down another layer of fibers in a generally cross direction, with the fibers being merely matted together. The individual fibers, strands or yarns 66, impart longitudinal strength. The reinforcement fabrics include transverse fibers that also provide side to side strength. The reinforcement fibers in the upper portion of the conveyor slats CS resist any tendency of the conveyor slats to bow upwardly. The longitudinal fibers in the lower regions of the conveyor slats CS resist any tendency of the conveyor slat to bow downwardly. Any tendency of the conveyor slats CS to bow upwardly would put the upward longitudinal fibers in tension. Any tendency of the conveyor slats CS to bow downwardly would put the lower reinforcement fibers 66 into tension. Stated another way, the fibers on the side of the slat that assumes a convex shape during bending are put into tension and resist the bending. As will hereinafter be explained in more detail, the longitudinal fibers may be pretensioned during the forming of the conveyor slats CS. Pretensioning of reinforcement members increases the strength of the conveyor slat of which they are a pan.

FIG. 4 shows the lower edge 54 of the lip on wing portion 50 where it bears down onto the bearing material 56. The veil 34 covers this lower edge. At this location, the veil 34 provides the edge 54 with a tough surface having relatively low friction characteristics. The presence of veil 34 provides a good bearing action where edge 54 meets bearing material 56. It also provides a good sealing action at this location. The veils 72, 74, 76 provide low friction surfaces where the conveyor slat CS are apt to contact and rub on the surfaces of the guide members 36.

Figure 5:
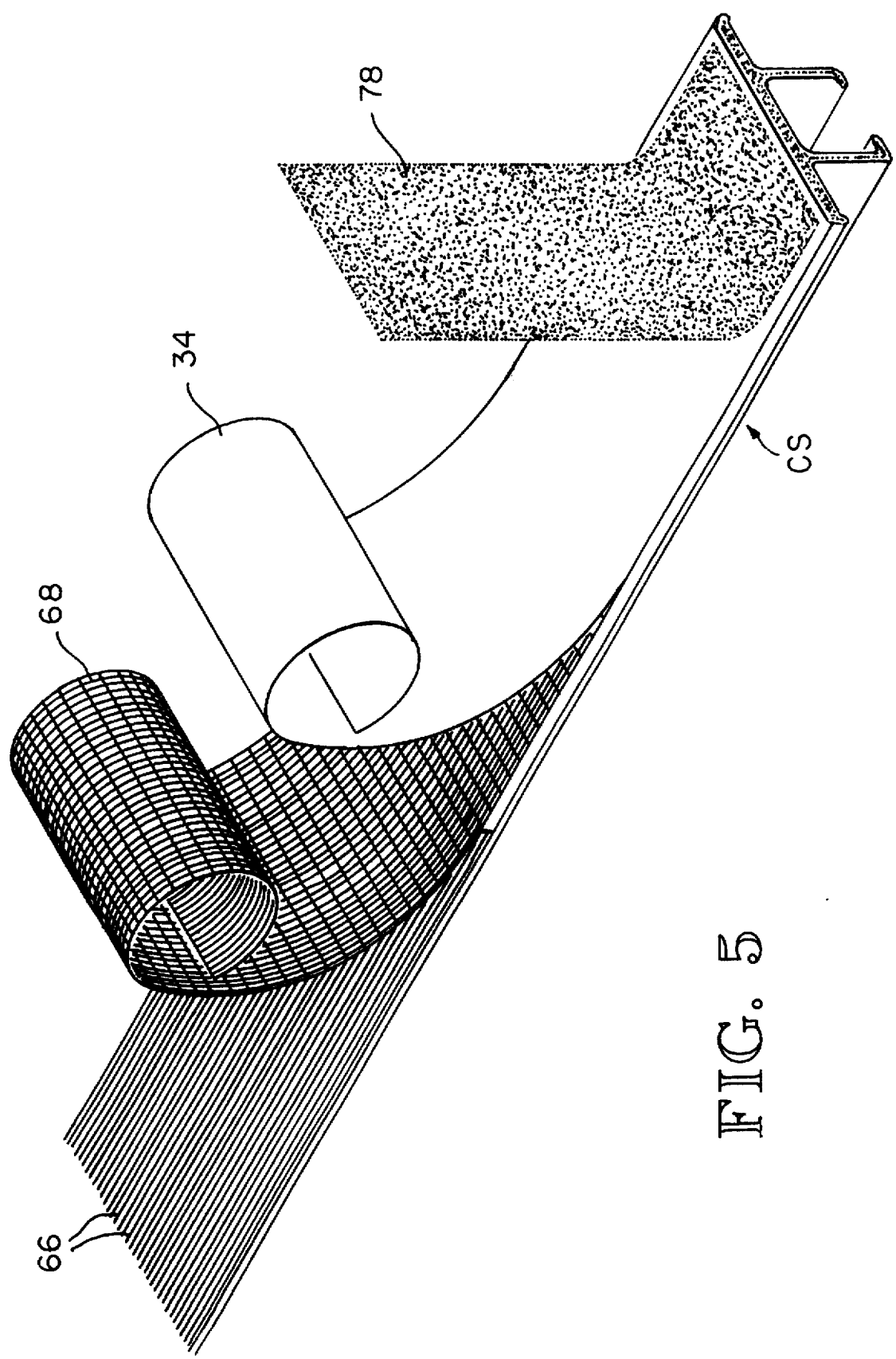
FIG. 5 is a pictorial view of a pultruded conveyor slat, showing reinforcement fiber strands, reinforcement fiber fabric, a veil fabric and a top layer of grit coming together into and onto a resin matrix to form a slat body.

Referring to FIG. 5, the roving fibers (e.g. glass strands or yarn) impart longitudinal strength to the conveyor slat CS. The woven or non-woven reinforcement fabric 68 provides both longitudinal strength and sideways strength. The veil 34 prevents the reinforcement fibers 66, 68 from extending out to the surface of the conveyor slat CS. In addition, it provides a smooth surface with increased wear resistance. Veils may also be used to provide ultraviolet protection, or color marking or printing (production identification, logos, etc.), or reduce die wear.

According to an aspect of the invention, the conveyor slat CS may be provided with a wear resistant, high friction top surface. This surface may be formed by bonding a grit material 78 to the upper surface of the conveyor slat CS. The grit may be sand, crushed walnut shells, slag particles, fly ash particles, or ground tires, for example.

Figure 6:
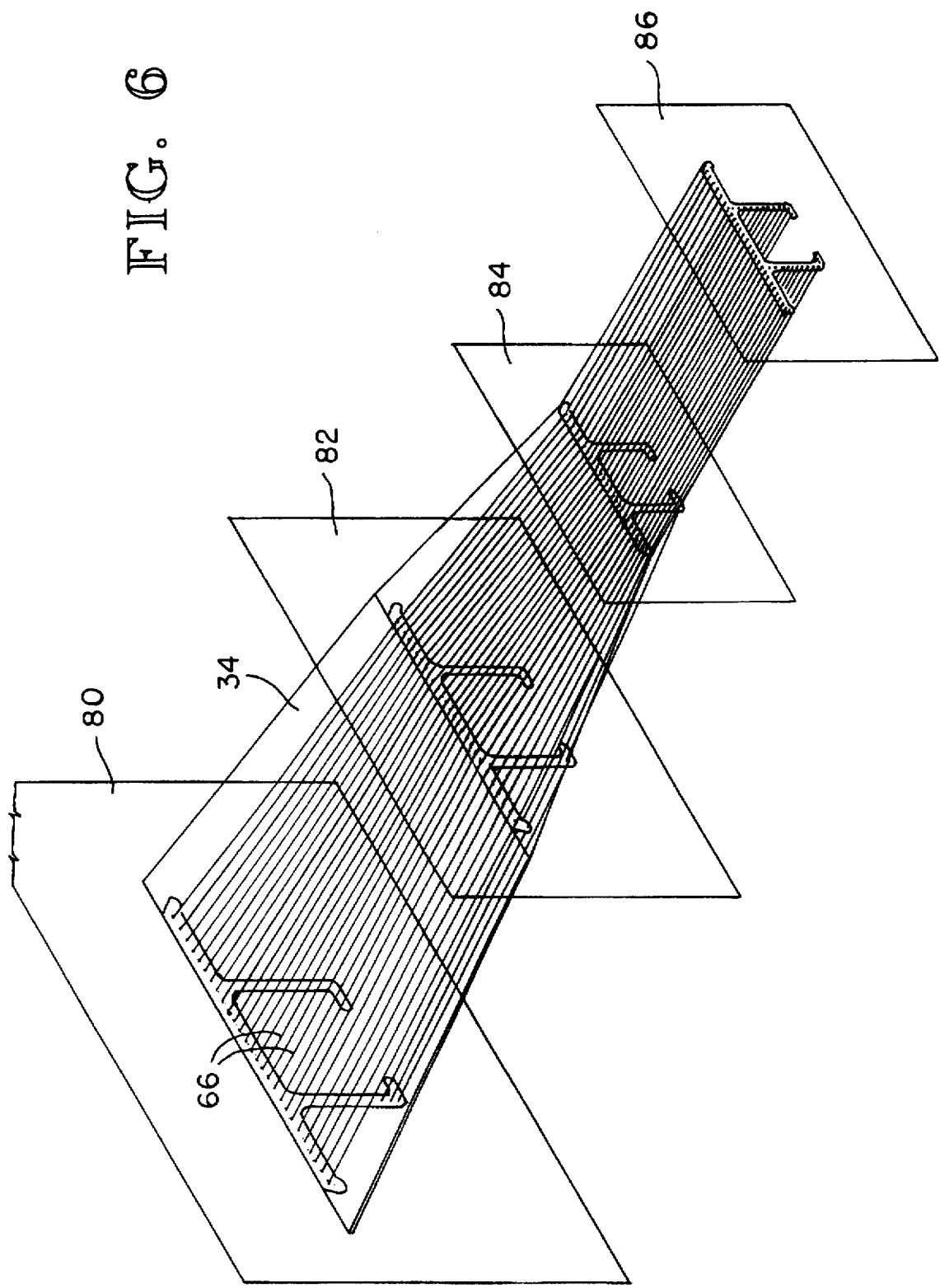
FIG. 6 is a pictorial view showing reinforcement fiber strands and fabric passing through a series of preforms.
Figure 7:
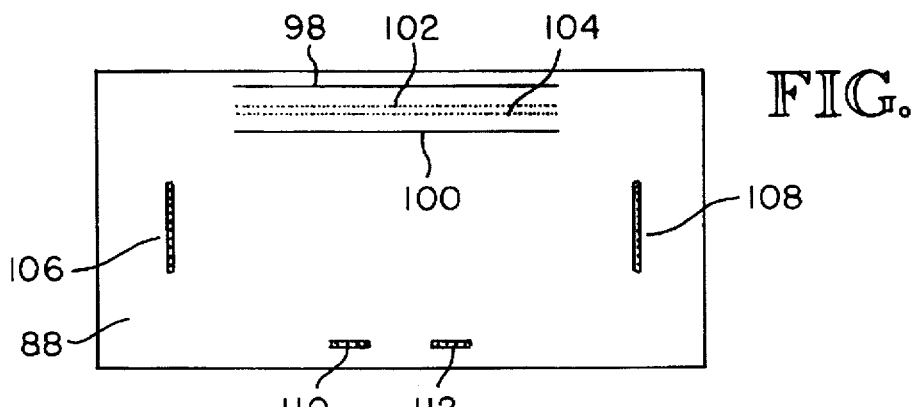
FIGS. 7–11 are elevation views of four preforms and a die, such views showing the reinforcement fiber strands and fabric being progressively shaped into a desired pattern before being impregnated with resin, then moved into the forming die.
Figure 8:
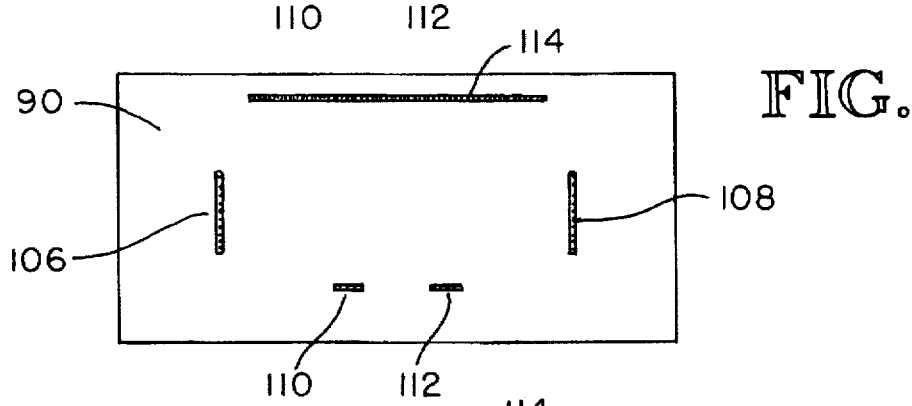
Figure 9:
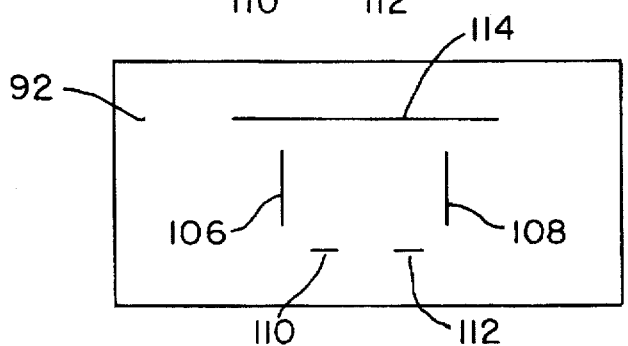
Figure 10:
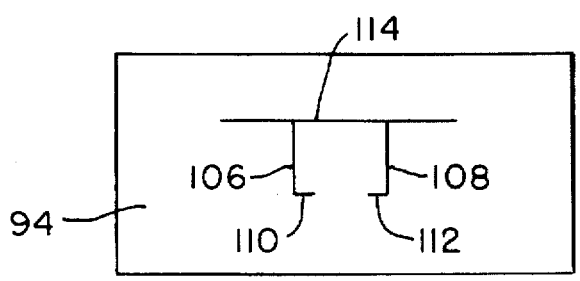
Figure 11:
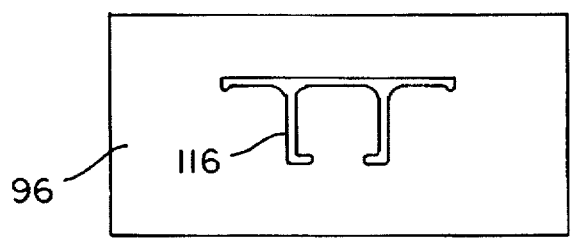

FIG. 6 shows four stations in the former 24, designated 80, 82, 84, 86. The pattern of individual strands 66 are shown to be progressively brought together until they are nearly in the final positions that they will occupy in the conveyor slat CS. FIG. 6 shows the veil 34 being brought into its position on the fibers 66, 68. This occurs after the fibers 66, 68 have been impregnated with the resin.

FIGS. 7–11 show example preforms, designated 88, 90, 92, 94, 96. These preforms are usually downstream of the impregnation zone (resin bath) 22. Preform 86 includes upper avenues 98, 100 for the reinforcement fabric 68 and upper avenues 102, 104 for the individual fibers or strands 66. It also includes side avenues 106, 108 for the side groups of individual fibers or strands 66 and bottom avenues 110, 112 for the reinforcement fibers or strands 66 that will be within the bottom sections 44, 46 of the conveyor slat CS. In preform 90, the upper avenues 98, 100, 102, 104 become a single avenue 114. The side avenues 106, 108 move closer together. In preform 92, the side avenues 106, 108 move closer together from their positions in preform 90 and the avenue 114 moves down closer to avenues 106, 108. In preform 94, the avenues 106, 108, 110, 112, 114 all meet. Preform 96 shows the cross-section 116 of preformer 96 which is inside the impregnator 22. The reinforcement fibers 66, 68 are impregnated with resin as they pass through the guide avenue 116 in preformer 96.

As the fibers 66, 68 move through the formers 80, 82, 84, 86, in the resin bath, they are formed progressively in stages to remove excess resin and to achieve the approximate geometry of the finished profile.

The guides or formers in the impregnation bath are successively offset first downwardly and then upwardly in the direction of movement through the impregnation bath 22. This causes some bending of the fibers which allows fiber bundles to open and resin to coat individual glass fibers. It also creates drag forces on the fibers 66, 68. The puller 28 pulls against these drag forces and against additional drag forces that are generated in the former 24 and in the die 26. The pull forces and the opposing drag forces act to tension the longitudinal reinforcement fibers 66, 68. This tensioning holds the fibers 66, 68 in position as they move through the forming die 26. It also pretensions the longitudinal fibers. As the conveyor slat CS passes through the forming die 26, the longitudinal fibers 66, 68 are in tension and thus the resin hardens on these tensioned fibers. This pretensioning makes the conveyor slat CS stronger.

FIGS. 12 and 13 show a modified embodiment of the conveyor slat, designated CS'. This conveyor slat CS' is like the embodiment shown by FIGS. 2–5 except that its top portion 38 includes a low density insert 118. Insert 118 is in the nature of a panel of a width as shown in FIGS. 12 and 13 and extending the full length of the conveyor slat CS', in one piece or segments. The insert 118 may be constructed from a low density foam plastic, balsa wood, a low density cellular structure, or some other low density material. It is necessary that there be both resin and reinforcing fibers 66 and/or 68 both above and below the insert 118. This is shown by FIG. 13. The low density insert 118 is lightweight in comparison to the resin and reinforcement fibers. Thus, its inclusion in the conveyor slat CS' reduces the weight of the conveyor slat CS'. It also increases the stiffness of the conveyor slat CS. However, the top portion of the conveyor slat CS' remains quite strong in all ways, for the same reason that a honeycomb panel is strong. It is preferred that the conveyor slat CS' include the veil 34. It is also preferred that it include the other veils 72, 74, 76, or, in their place, thermoplastic coatings or co-extruded layers.

Figure 15:
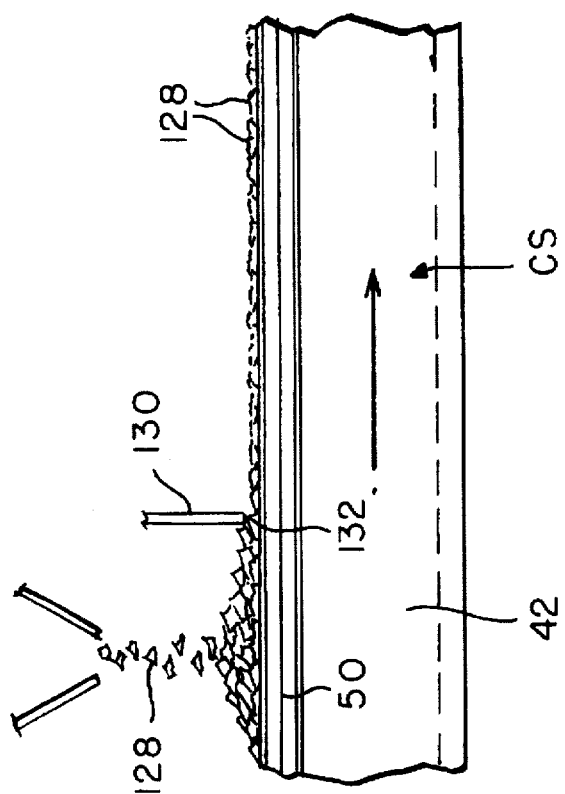
FIG. 15 is a view showing grit being deposited on the adhesive layer applied to the top surface of the conveyor slat.
Figure 14:
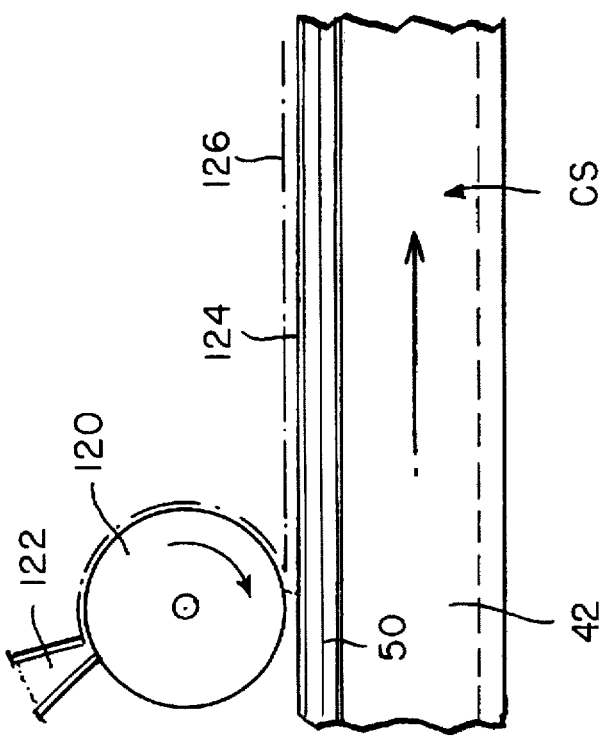
FIG. 14 is a view showing an adhesive being applied to the top surface of a slat by means of a roller.

FIG. 14 shows a roller 120 applying an adhesive 122 to the upper surface 124 of a floor slat CS. In this or some other manner (spray, dip, wiper, flood nozzle, for example), a thin adhesive layer 126 is applied to the upper surface of the conveyor slat CS. FIG. 15 shows grit 78 being deposited on the adhesive layer 126. The grit 78 may be deposited in excess amounts. A spreader 130, or other method, may be used for spreading the grit 78 over the adhesive coated upper surface of the conveyor slat CS. The lower edge of the spreader 130 may be spaced above the upper surface of the conveyor slat CS so that a grit passageway 132 is defined vertically between this lower edge and the upper surface of the conveyor slat CS. A substantially uniform layer of the grit 78 passes through the passageway 132. This layer of grit 78 is held by the adhesive layer 126. When the adhesive 126 cures, it secures the grit 78 to the conveyor slat CS. It also provides wear/impact resistance. The grit 78 increases the coefficient of friction of the upper surface of the conveyor slat CS. The resin can be formulated, and veils can be selected, so that the other surfaces of the conveyor slat CS will have relatively low coefficients of friction. The bonding of the grit 78 to the top surface of the conveyor slat CS provides a relatively large coefficient of friction where it is needed. Also, as previously stated, a veil of sail-cloth or the like can be applied to the upper surface of the conveyor slat CS and then removed, e.g. by continuously moving take-up reels (not shown), to in this manner texture the upper surface. Texturing in this manner can also be used to increase the coefficient of friction of the slat surface or to improve adhesion in a secondary bonding process.

Figure 16:
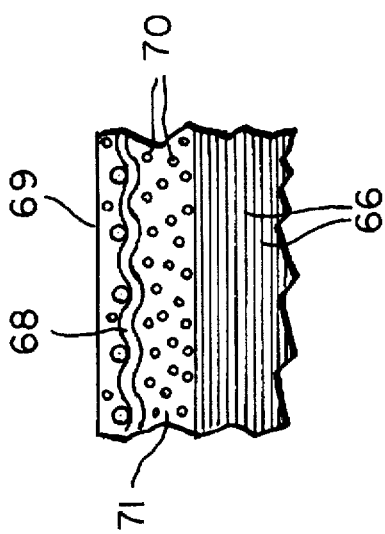
FIG. 16 is an enlarged scale, fragmentary sectional view of a portion of a slat body, showing low density particles in the matrix.

FIG. 16 shows a fragmentary portion of a conveyor slat body 69 which is shown to include individual reinforcement fibers 66, a reinforcement fabric 68, and small hollow glass spheres 70. The glass spheres 70 are introduced into the resin matrix 71 for the purpose of decreasing the weight of the conveyor slat and improving abrasion resistance and/or reducing surface friction. Other low density particulate material could be used in place of the hollow glass spheres 70.

FIGS. 17–20 show two additional conveyor slat embodiments constructed in accordance to the present invention. Slat CS", shown by FIGS. 17 and 18, include a seal 134 that is like the seal disclosed in U.S. Pat. No. 5,335,778, granted Aug. 9, 1994 to Arthur L. Wilkins. This seal 134 seals upwardly against a surface 136 on the adjoining conveyor slat CS". The conveyor slats CS" are supported and guided by bearings 138 and longitudinal beams 140. This relationship of the conveyor slats on the bearings 138 and the beams 140 is disclosed in my U.S. Pat. No. 4,858,748, granted Aug. 22, 1989.

Like the earlier embodiments, conveyor slat CS" has a conveyor body comprising reinforcement fibers within a resin matrix. The ends of the fibers are shown in FIGS. 17 and 18. Some of them are designated 66. However, it is to be understood, that reinforcement fibers in fabric form 68 can also be used. Conveyor slats CS" have top portions 142, side wings 144, 146, and sidewall portions 148, 150, including lower sections 152, 154. Preferably, the lower surfaces of the top portions 142 are covered by a veil 156, or a co-extruded surface layer, or a surface coating or surface region layer. The lower surfaces of the lower sections 152, 154 of the sidewalls 148, 150 are also covered by veils 158, 160, or bo a co-extruded surface layer, or a surface coating or surface region layer. A veil material is chosen that will provide the veiled surfaces with low friction, wear resistant characteristics. Preferably also, a similar veil is provided on surface 136. The outer lip portion of the seal members 134 will contact and slide relatively along this veiled surface.

The conveyor slat CS''', and its seal member, are disclosed in my now allowed U.S. patent application Ser. No. 08/722, 905, filed Sep. 27, 1996, and entitled Seal Member For Reciprocating Slat Conveyors. This conveyor slat CS''' is preferably also supported and guided by bearings 138 and longitudinal beams 140, such as discussed above in connection with FIGS. 7 and 18. Like the earlier conveyor slat embodiments, conveyor slat CS''' has a slat body made up of reinforcement fibers within a resin matrix. Some of the fibers are designated 66. However, it is to be understood that reinforcement fiber fabrics 68 may also be used. Preferably, conveyor slat CS''' includes veils 156', 158', 160' at the same locations and for the same purpose as veils 156, 158, 160 in conveyor slat CS". Another veil 162 is applied where the seal member 164 contacts the adjacent conveyor slat CS'''. The veils 156', 158', 160', 162 provide low friction, wear resistant surfaces.

The most commonly used pultrusion resin for mat/roving laminates is a flexible isophthalic polyester. This resin is more forgiving in composites with sharp radii, different thicknesses and heavy wall cross-sections. The surface remains shiny with minimum scaling at the slower pultrusion speeds. Exotherm stress cracks are essentially eliminated. This resin molds well with the conditions under which structures are pultruded, i.e., slower line speeds due to more difficult part design and consequent reinforcement placement requirements. This resin is set forth by way of example but the invention is not limited to any particular resin. In some applications, it would be desired to use a food grade resin. A food grade resin is a resin that can be safely contacted by food products and food grade crushed ice for example. For such conveyors, food grade veil and filler materials would also be used. A vinyl ester resin may be used for applications where corrosion is a major factor. This resin would be used with corrosion resistive fibers and fillers.

Fiberglass is a typical and popular reinforcement fiber material, both for the reinforcement strands and the reinforcement fabric. However, the invention is not limited to the use of glass reinforcement fibers. Other reinforcement fibers may be used, such as nylon fibers, polyester fibers, aramids, and carbon fibers, for example.

The surface veils are fabrics that act as a very thin sponge, absorbing resin to fill about ninety percent (90%) of their volumes. Surface veils are made of polyester, nylon, aramid, phenolic and other types of fibers. Polyester fibers preferably are used for the veils in the conveyor slats of the present invention. As the veils are applied, they are in effect absorbed into the resin. They are not a layer on the resin matrix but rather penetrate into surface regions of the matrix while providing boundary material that is exposed at the surface.

The adhesive used for securing the grit layer to the upper surface of the conveyor slat may be applied in other ways than by use of a roller. For example, it can be sprayed on the slat surface. A contact nozzle with a bottom doctor knife can be used. Also, a surface wiper or a dip vat can be used. There are other materials that can be added to the resin matrix in place of or in addition to the glass spheres. These are carbon spheres, aluminum silicate clay, calcium carbonate, aluminum trihydrate and carbon black. These substances reduce the weight of the conveyor slat. They can also make the slat fire resistant, impact resistant and abrasion resistant. Some also make it easier to pultrude the conveyor slat.

The illustrated and/or described embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. For use in a reciprocating slat conveyor having a plurality of adjacent conveyor slats that are mounted to be selectively reciprocated endwise, a pultruded conveyor slat comprising:

a resin matrix forming a slat body having a top portion and a pair of laterally spaced apart side portions depending from said top portion, said side portions having lower sections; and reinforcement fibers in said top portion and at least the lower sections of said side portions extending longitudinally of said slat body, wherein in use the longitudinal fibers in the top portion resist any tendency of the conveyor slat to bend upwardly and the longitudinal fibers in the lower sections of the side portions resist any tendency of the conveyor slat to bend downwardly.

2. A pultruded conveyor slat according to claim 1, wherein at least said top portion also includes laterally extending reinforcement fibers.

3. A pultruded conveyor slat according to claim 2, wherein at least some of the longitudinally extending reinforcement fibers, and the laterally extending reinforcement fibers are parts of a reinforcement fiber fabric.

4. A pultruded conveyor slat according to claim 1, wherein at least a portion of the reinforcement fibers are individual fiber strands.

5. A pultruded conveyor slat according to claim 1, wherein the top portion of the slat includes an upper surface and a grit layer bonded to said upper surface, said grit layer providing a high friction surface.

6. A pultruded conveyor slat according to claim 1, wherein said top portion of the conveyor slat includes an upper surface region and a veil embedded in the upper surface region, to increase wear resistance of said upper surface region and to prevent reinforcement fibers from reaching said upper surface region.

7. A pultruded conveyor slat according to claim 1, wherein the longitudinally extending reinforcement fibers are pretensioned.

8. For use in a reciprocating slat conveyor having a plurality of adjacent conveyor slats that are mounted to be selectively reciprocated endwise, a pultruded conveyor slat comprising:

a resin matrix forming a slat body having a top portion and a pair of laterally spaced apart side portions depending from said top portion, said side portions having lower sections; and reinforcement fibers in said matrix, including pretensioned longitudinal fiber strands.

9. A pultruded conveyor slat according to claim 8, wherein the top portion of the slat includes an upper surface and a grit layer bonded to said upper surface, said grit providing a high friction surface.

10. A pultruded conveyor slat according to claim 8, wherein the top portion of the conveyor slat includes an upper surface region and a veil embedded in the upper surface region, to increase wear resistance of said upper surface region and to prevent reinforcement fibers from reaching said upper surface region.

11. For use in a reciprocating slat conveyor having a plurality of adjacent conveyor slats that are mounted to be selectively reciprocated endwise, a pultruded conveyor slat comprising:

a resin matrix forming a slat body having a top portion and a pair of laterally spaced apart side portions depending from said top portion;

reinforcement fibers in said matrix extending longitudinally of the slat body; and said resin matrix being a food grade resin, permitting the conveyor slat to be used in contact with substances that must only be contacted by food grade materials.

12. A pultruded conveyor slat according to claim 11, wherein said matrix includes both a fabric composed of reinforcement fibers and individual fiber strands.

13. A pultruded conveyor slat according to claim 12, wherein said top portion of the conveyor slat includes an upper surface region and a veil embedded in the upper surface, said veil having surface characteristics different from the surface characteristics of the resin matrix.

14. For use in a reciprocating slat conveyor having a plurality of adjacent conveyor slats that are mounted to be selectively reciprocated endwise, a pultruded conveyor slat comprising:

a resin matrix forming a slat body having a top portion and a pair of laterally spaced apart side portions depending from said top portion;

at least one low density insert in said matrix, extending longitudinally of the slat body; and reinforcement fibers in said matrix, at least some extending longitudinally of the slat body.

15. A pultruded conveyor slat according to claim 14, wherein the longitudinally extending reinforcement fibers are pretensioned.

16. A pultruded conveyor slat according to claim 14, wherein the low density insert is a foam plastic.

17. A pultruded conveyor slat according to claim 14, wherein the low density insert is balsa wood.

18. A pultruded conveyor slat according to claim 14, wherein the low density insert is a cellular structure.

19. For use in a reciprocating slat conveyor having a plurality of adjacent conveyor slats that are mounted to be selectively reciprocated endwise, a pultruded conveyor slat comprising:

a resin matrix forming a slat body having a top portion and a pair of laterally spaced apart side portions depending from said top portion;

particles of a material lower in density than said resin distributed throughout at least a portion of said matrix; and reinforcement fibers in said matrix.

20. For use in a reciprocating slat conveyor having a plurality of adjacent conveyor slats that are mounted to be selectively reciprocated endwise, a pultruded conveyor slat comprising:

a resin matrix forming a slat body having a top portion and a pair of laterally spaced apart side portions depending from said top portion;

reinforcement fibers incorporated within said matrix, at least a portion of said reinforcement fibers extending longitudinally of the slat body;

said slat body having a surface region that in use is contacted by an elastomeric seal member; and a veil at said surface region, extending longitudinally of the slat body, in a position to be contacted by the elastomeric seal, said veil providing a smooth, low friction surface where it is contacted by the elastomeric seal, and further shielding against reinforcement fibers in the matrix being at the surface of the slat body where the elastomeric seal contacts the surface.

21. A pultruded conveyor slat according to claim 20, wherein the slat body has surface regions that in use are contacted by a bearing, and said surface regions are provided with a veil that is positioned to contact and be contacted by the bearing, said veil providing a smooth, low friction surface where it contacts the bearing, and also shielding against reinforcement fibers in the slat body being where the slat body contacts and is contacted by the bearing.

22. A pultruded conveyor slat according to claim 20, wherein the slat includes a top portion having an upper surface and a grit layer bonded to said upper surface.

23. A pultruded conveyor slat according to claim 21, wherein the slat includes a top portion having an upper surface and a high friction grit bonded to said upper surface.

24. For use in a reciprocating slat conveyor having a plurality of adjacent conveyor slats that are mounted to be selectively reciprocated endwise, and in which longitudinal bearings having upwardly directed bearing surfaces are positioned between adjacent conveyor slats, a pultruded conveyor slat comprising:

a resin matrix forming a slat body having a top portion and a pair of laterally spaced apart side portions depending from said top portion, said top portion having wing portions extending laterally outwardly from the side portions;

reinforcement fibers incorporated within said resin matrix;

some of said reinforcement fibers extending longitudinally of the slat body;

said wing portions having downwardly directed edges, each in contact with a said bearing; and a veil on each said edge, extending longitudinally of the slat body and embedded in the resin matrix, in a position to contact a said bearing, said veil providing a smooth, low friction surface region where it contacts the bearing, and further shielding against reinforcement fibers in the matrix being at the edge surface where the edge contacts the bearing.

25. A pultruded conveyor slat according to claim 20, wherein the slat includes a top portion having an upper surface and a grit layer bonded to said upper surface.

\* \* \* \* \*